(12) United States Patent
Doljack et al.

(10) Patent No.: US 7,599,168 B2
(45) Date of Patent: Oct. 6, 2009

(54) ACTIVE BALANCING MODULAR CIRCUITS

(75) Inventors: Frank Anthony Doljack, Pleasanton, CA (US); Neal Schultz, Redwood City, CA (US); Hundi P. Kamath, Los Altos, CA (US); Jim Strain, Newark, CA (US)

(73) Assignee: Cooper Technologies Company, Houston, TX (US)

( * ) Notice: Subject to any disclaimer, the term of this patent is extended or adjusted under 35 U.S.C. 154(b) by 78 days.

(21) Appl. No.: 12/027,118

(22) Filed: Feb. 6, 2008

(65) Prior Publication Data

US 2008/0174937 A1 Jul. 24, 2008

Related U.S. Application Data

(63) Continuation of application No. 10/781,571, filed on Feb. 17, 2004, now Pat. No. 7,342,768.

(51) Int. Cl.
*H01G 4/38* (2006.01)
(52) U.S. Cl. ............... 361/328; 361/330; 361/763; 361/765; 320/118; 320/120; 320/122
(58) Field of Classification Search ............ 361/328, 361/330, 763, 765, 783, 785; 320/118, 120, 320/122
See application file for complete search history.

(56) References Cited

U.S. PATENT DOCUMENTS

| | | | |
|---|---|---|---|
| 4,686,619 A | 8/1987 | Edwards | 363/126 |
| 5,532,575 A | 7/1996 | Ainsworth et al. | 323/211 |
| 5,677,613 A | 10/1997 | Perelle | 320/6 |
| 6,072,691 A | 6/2000 | Suhara et al. | 361/502 |
| 6,078,165 A * | 6/2000 | Ashtiani et al. | 320/116 |
| 6,081,095 A | 6/2000 | Tamura et al. | 320/118 |
| 6,151,223 A | 11/2000 | Tamura et al. | 363/19 |
| 6,388,424 B1 | 5/2002 | Hidaka et al. | 320/122 |
| 6,624,612 B1 | 9/2003 | Lundquist | 320/118 |
| 6,741,437 B2 * | 5/2004 | Vanhee | 361/57 |
| 6,777,908 B2 | 8/2004 | Thorne et al. | 320/103 |
| 6,806,686 B1 | 10/2004 | Thrap | 320/118 |
| 7,215,204 B2 * | 5/2007 | Bambridge et al. | 330/307 |

(Continued)

FOREIGN PATENT DOCUMENTS

EP 1107438 6/2001

(Continued)

OTHER PUBLICATIONS

P. Barrade, "Series Connection of Supercapacitors: Comparative Study of Solution for the Active Equilization of the Voltages" Article.

(Continued)

*Primary Examiner*—Nguyen T Ha
(74) *Attorney, Agent, or Firm*—Armstrong Teasdale LLP

(57) ABSTRACT

Provided are active balancing modules that control voltage imbalances between capacitors stacked in a series arrangement and methods for their manufacture. These modules are simple and inexpensive to manufacture, and versatile. They may be used alone or they may be combined together to form a multi-module active balancing circuitry for a plurality of capacitors stacked in a series arrangement. The modules may further be aligned in either a side-by-side topology or an overlapping topology.

34 Claims, 6 Drawing Sheets

U.S. PATENT DOCUMENTS

| | | | |
|---|---|---|---|
| 7,342,768 B2 * | 3/2008 | Doljack et al. | 361/328 |
| 7,471,501 B2 * | 12/2008 | Erhardt et al. | 361/328 |
| 2002/0017895 A1 | 2/2002 | Kawashima | 320/118 |
| 2002/0190692 A1 | 12/2002 | Marten | 320/116 |
| 2003/0099123 A1 | 5/2003 | Odell | 363/143 |
| 2003/0214267 A1 | 11/2003 | Long | 320/116 |
| 2004/0022075 A1 | 2/2004 | Perry | 363/21.01 |
| 2004/0212346 A1 | 10/2004 | Thrap | 320/119 |
| 2008/0007891 A1 * | 1/2008 | Doljack | 361/502 |

FOREIGN PATENT DOCUMENTS

| | | |
|---|---|---|
| EP | 1315276 | 5/2003 |
| JP | 2001-218382 | 10/2001 |
| WO | WO 01-22554 | 3/2001 |

OTHER PUBLICATIONS

Sean P. Gold, "Powerstor Aerogel Capacitor Application Engineering", Jun. 24, 1999.

F. Doljack, "Active Balancing", Cooper Bussmann, Sales Training, Dec. 15, 2003.

International Search Report, 13 pgs., International Application No. PCT/US2005/002532.

* cited by examiner

US 7,599,168 B2

ACTIVE BALANCING MODULAR CIRCUITS

BACKGROUND OF THE INVENTION

The present invention relates to active balancing circuitry for capacitors and methods for their manufacture. More particularly, the invention relates to a module based active balancing circuitry for capacitors stacked in a series arrangement.

A capacitor is often designed with a maximum operating voltage rating where operation above this maximum operating voltage rating will generally lead to excessive leakage current, subsequent gas generation, and ultimately failure of the capacitor. In order to construct capacitances for higher voltage applications, capacitors of identical value and rating are stacked in a series arrangement. During charging as well as after charging of the capacitors, the total voltage divides equally across each capacitor in the stack so long as the capacitance values of each capacitor remain identical. Once charging is mostly complete and equilibrium conditions in the stack are reached, the voltage continues to divide equally across each capacitor as long as the leakage current of each capacitor is equal. In sum, unequal voltages across capacitors in such a series arrangement generally have two causes: 1) unequal capacitance values; 2) unequal equilibrium leakage current.

Several approaches have been conventionally implemented to attempt to control the voltage imbalances due to unequal capacitance values or to unequal equilibrium leakage current. In one approach, a technique known as passive balancing is used. Passive balancing involves using passive elements to equalize the voltages between the capacitors in the stack. Typically, this includes connecting equal valued resistors in parallel with the capacitors. Although passive balancing may work initially, passive balancing has a drawback of not being able to adjust for voltage imbalances due to changes in capacitance values or leakage currents over time.

In another approach, a technique known as active balancing is used. Active balancing involves using active elements to equalize the voltages between capacitors. Although this technique can be used to adjust for voltage unbalances over time, the conventional implementation of these active devices often is complicated and expensive.

Accordingly, there is a need to provide improved apparatus and corresponding methods that are easier and less expensive to implement and that can control voltage imbalances between capacitors stacked in a series arrangement, thereby, improving the capacitors life expectancy and electrical performance.

SUMMARY OF THE INVENTION

To achieve the foregoing, the present invention provides active balancing modules that control voltage/leakage current imbalances between capacitors stacked in a series arrangement and methods for their manufacture. These modules are simple and inexpensive to manufacture, and versatile. They may be used alone or they may be combined together to form a multi-module active balancing circuitry for a plurality of capacitors stacked in a series arrangement.

In one aspect, the invention provides a module having inductor-free circuitry for controlling voltage imbalances between a pair of capacitors connected in a series arrangement. The module includes a first terminal configured for connection to a positive plate of the first capacitor; a second terminal configured for connection to a negative plate of the first capacitor and to a positive plate of the second capacitor; a third terminal configured for connection to a negative plate of the second capacitor; and an active element integrated within the inductor-free circuitry between the first, second, and third terminals. The active element is adapted to substantially balance the voltage imbalances between the pair of capacitors. The active element also has power connections to the first and third terminals.

In one embodiment, the active element is an op amp. The op amp has an input, an output, and a feedback loop where the input is connected to two voltage dividing resistors. Additionally, the output may be connected to the second terminal through an optional current limiting resistor. Generally, the feedback loop includes a feedback resistor.

In another embodiment, the active element is a switched voltage converter. Typically, the switched voltage converter incorporates a flying capacitor.

Yet, in another embodiment, at least one of the terminals is further configured for connection to a second module having inductor-free circuitry for controlling voltage imbalances between a second pair of capacitors connected in the series arrangement. In general, the first and second modules' inductor-free circuitries are substantially identical. Furthermore, the first and second modules' circuitry may overlap upon connection to the second module. In some cases, the first and second module's circuitry overlap at one of the terminals. In other cases, the first and second modules' circuitry overlap across a common capacitor shared by the two pairs of capacitors.

In another aspect, the invention provides a capacitor device package that includes a plurality of capacitors electrically connected in a series arrangement; and a module having inductor-free circuitry for controlling voltage imbalances between a pair of capacitors connected in the series arrangement. The module includes a first terminal configured for connection to a positive plate of the first capacitor; a second terminal configured for connection to a negative plate of the first capacitor and to a positive plate of the second capacitor; a third terminal configured for connection to a negative plate of the second capacitor; and an active element integrated within the inductor-free circuitry between the first, second, and third terminals. The active element is adapted to substantially balance the voltage imbalances between the pair of capacitors. The active element also has power connections to the first and third terminals.

In one embodiment, the plurality of capacitors is mounted on a motherboard having electrical connections for connecting the plurality of capacitors, the module, and external connections with each other. Additionally, the module may be mounted on a daughter board where the daughter board is mounted on the motherboard.

In another embodiment, the plurality of capacitors is connected to external leads in a flex circuit construction. The module is mounted across the external leads, the module also having a flex circuit construction.

In some cases, a substrate is positioned above the module, the plurality of capacitors, and the motherboard. Furthermore, portions of the substrate, motherboard, module, and plurality of capacitors may be encapsulated in molding material.

Yet, in another aspect, the invention provides a method for controlling voltage imbalances between a pair of capacitors connected in a series arrangement. The method includes: (1) forming a first terminal configured for connection to a positive plate of the first capacitor; (2) forming a second terminal configured for connection to a negative plate of the first capacitor and to a positive plate of the second capacitor; (3) forming a third terminal configured for connection to a negative plate of the second capacitor; and (4) integrating an active element within an inductor-free circuitry between the first, second, and third terminals such that the active element substantially balances the voltage imbalances between the pair of capacitors, the active element having power connections to the first and third terminals.

These and other features and advantages of the present invention are described below with reference to the drawings.

DETAILED DESCRIPTION OF PREFERRED EMBODIMENTS

Figure 1A:
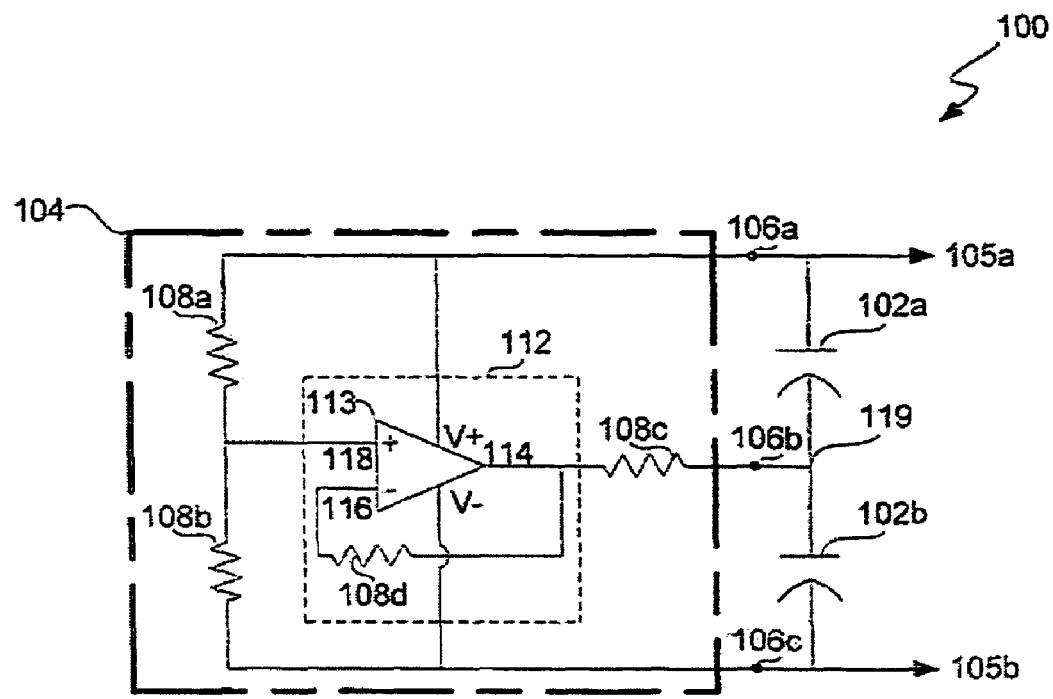
FIG. 1A illustrates an active balancing system that includes a plurality of capacitors coupled to an active balancing module in accordance with various embodiments of the present invention.

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention provides active balancing modules that contain active balancing circuitry to control voltage imbalances between capacitors stacked in a series arrangement and methods for their manufacture. These modules are simple and inexpensive to manufacture, and versatile. They may be used alone or they may be combined together to form a multi-module active balancing circuitry for a plurality of capacitors stacked in a series arrangement. The modules may further be aligned in either a side-by-side topology or an overlapping topology.

Introduction

As mentioned earlier, unequal voltages across capacitors in a series arrangement generally have two causes: 1) unequal capacitance values; 2) unequal equilibrium leakage current. Unequal capacitance values may result from manufacturing variations or aging due to the use of the capacitors over time. Unequal capacitance values can cause lower capacitance valued capacitors to operate beyond their maximum operating voltages that in turn may contribute to excessive leakage currents.

However, even when the capacitance values are well matched, leakage current mismatch can still cause overvoltages to occur on capacitors in the stack during equilibrium in the substantially charged state. A capacitor with a leakage current much greater than the average of its neighbors may charge its neighbors to beyond their maximum operating voltage, resulting in eventual failure of the affected capacitors. This is because, in an equilibrium state, leakage currents have a tendency to balance themselves. Therefore, the low leakage capacitors will accumulate charge in raising their voltages. Subsequently, the leakage currents of the affected capacitors increase and eventually balance with the leakage current of the discrepant capacitor.

Although a variety of capacitors may exhibit voltage imbalances, capacitors that tend to be more affected are electrolytic technology capacitors. This is because electrolytic technology capacitors usually have associated with them large leakage currents. Furthermore, electrolytic technology capacitors usually have large values of capacitance where they are popularly called supercapacitors or ultracapacitors.

Active Balancing Module

In order to control voltage imbalances between capacitors stacked in a series arrangement, an active balancing module is provided in the present invention. A purpose of the active balancing module is to maintain equal voltage across each capacitor in the series stack of capacitors when the capacitor stack is substantially fully charged, which occurs at an equilibrium state where relatively no charging or discharging is being performed on the series stack of capacitors from a connected power source or load. As will be discussed below, the active balancing module is applicable to any series stack of capacitors having two or more capacitors.

Figure 1B:
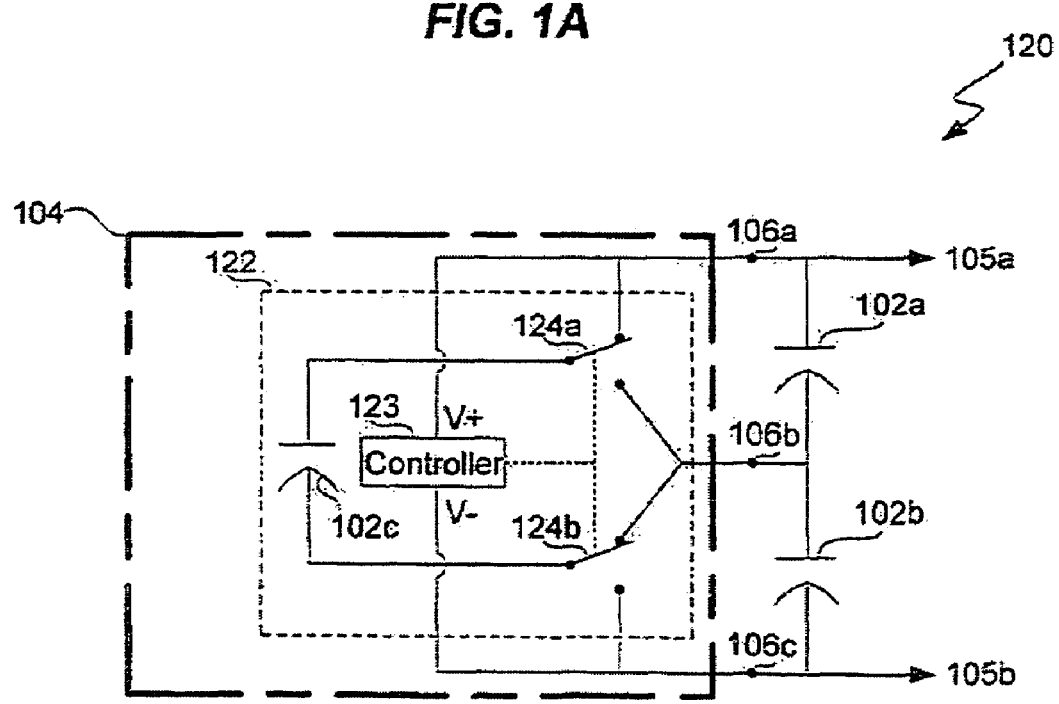
FIG. 1B illustrates an active balancing system that includes a plurality of capacitors coupled to an active balancing module in accordance with various embodiments of the present invention.

To begin, FIGS. 1A and 1B illustrate respectively active balancing systems 100 and 120 that include a plurality of capacitors 102 (e.g., 102a, 102b) coupled to an active balancing module 104 in accordance with various embodiments of the present invention. The coupling between the plurality of capacitors 102 and active balancing module 104 is done at three terminals 106 (e.g., 106a, 106b, 106c). Terminal 106a connects to a positive plate of capacitor 102a. Terminal 106b connects to a negative plate of capacitor 102a as well as to a positive plate of capacitor 102b. Terminal 106c connects to a negative plate of capacitor 102b. As shown, capacitors 102a and 102b are connected/stacked in a series arrangement where a voltage is applied through connections 105a and 105b. Connection 105a and 105b may be connected to a power source and/or a load for powering.

In general, active balancing module 104 includes an active element. In one embodiment, as illustrated in FIG. 1A, the active element is an op amp device 112. Op amp device 112 includes an op amp 113 that is adapted as a voltage follower. That is, an op amp circuit that uses voltage feedback where the circuit has high input impedance, low output impedance, and voltage gain of 1. As such, if the output 144 of op-amp 113 is connected to its inverting (−) input 116, the output voltage will seek whatever level is necessary to balance the inverting input's voltage with that applied to the non-inverting (+) input 118. If this feedback connection is direct, as in a straight piece of wire, the output voltage will substantially "follow" the non-inverting input's voltage.

In order to substantially balance the voltages of the capacitors, the input of op amp 113 is connected to a pair of voltage dividing resistors 108a and 108b where each resistor is in parallel with a corresponding capacitor (e.g., 102a, 102b). Voltage dividing resistors 108a and 108b are equal in resistance value. The value of resistance is chosen through an optimization algorithm which attempts to prevent any overvoltage in the stack given the worst case leakage value and simultaneously tries to minimize the additional leakage current that the voltage dividing resistors may introduce.

Op amp 113 and voltage dividing resistors 108a and 108b operate on the interstitial node 119 of the pair of capacitors 102a and 102b. Current is sourced or sunk from this node in order to force the voltage sharing across each capacitor to divide according to the division defined by the two voltage dividing resistors 108a and 108b. Current is sourced or sunk by drawing charge as appropriate from either the top (positive) plate of capacitor 102a or the bottom (negative) plate of capacitor 102b since the op amp's power connections V+ and V− are referenced to these points respectively.

Optionally, a current limiting resistor 108c may be applied to the output of the op amp as shown in FIG. 1A. However, the active element may already include current limiting short circuit protection. For example, op amp 113 may be integrated with current limiting short circuit protection. Another optional resistor is the feedback resistor 108d. Feedback resistor 108d may be used to balance the input offset current at the inputs. In general, the value of feedback resistor 108d is chosen as me parallel combination of voltage dividing resistors 108a and 108b.

Although a voltage follower by definition has a voltage gain of 1, its purpose has nothing to do with amplifying voltage, but rather with amplifying a signal's capacity to deliver current to a load (e.g., 102a, 102b). As such, the op amp implementation of active balancing module 104 sources and sinks large values of current to or from the capacitors during the discharge/recharge period of peak power demands. In addition, charge equalization against mismatched leakage currents during the periods of stable and equilibrium state of full charge can be realized. Thus, both causes of voltage imbalances, capacitance variation and mismatched leakage currents, can be effectively controlled.

Another embodiment of the active element in active balancing module 104 is illustrated in FIG. 1B. As shown, the active element is a flying capacitor device 122. Generally, flying capacitor device 122 utilizes a controller 123 to control the synchronous switching of switches 124a and 124b so that connection to a flying capacitor 102c can he oscillated between a plurality of capacitors 102 (e.g., 102a and 102b). Specifically, switches 124a and 124b must operate as break before make and be synchronous with each other. That is, both must first break before they can make. One switch cannot lead the other and make while the lagging one has not yet broken its contact. The connection between flying capacitor 102 and the plurality of capacitors will allow charge to either sink/source there between. Over time, the balancing of voltages between the plurality of capacitors can be achieved.

It is important to note that no inductive elements (i.e., inductors), which are relatively expensive, are used in active balancing module 104. Moreover, the powering of the active elements (e.g., 112, 122) in active balancing module 104 can be done through the quiescent current present in the system and/or referenced to a pair of capacitors (e.g., by connecting V+ of op amp 113/controller 123 to the positive plate of capacitor 102a; by connecting V− of op amp 113/controller 123 to the negative plate of capacitor 102b). In effect, each active balancing module 104 can be self-contained or work in combination with another as illustrated next in FIG. 2 below.

Figure 2:
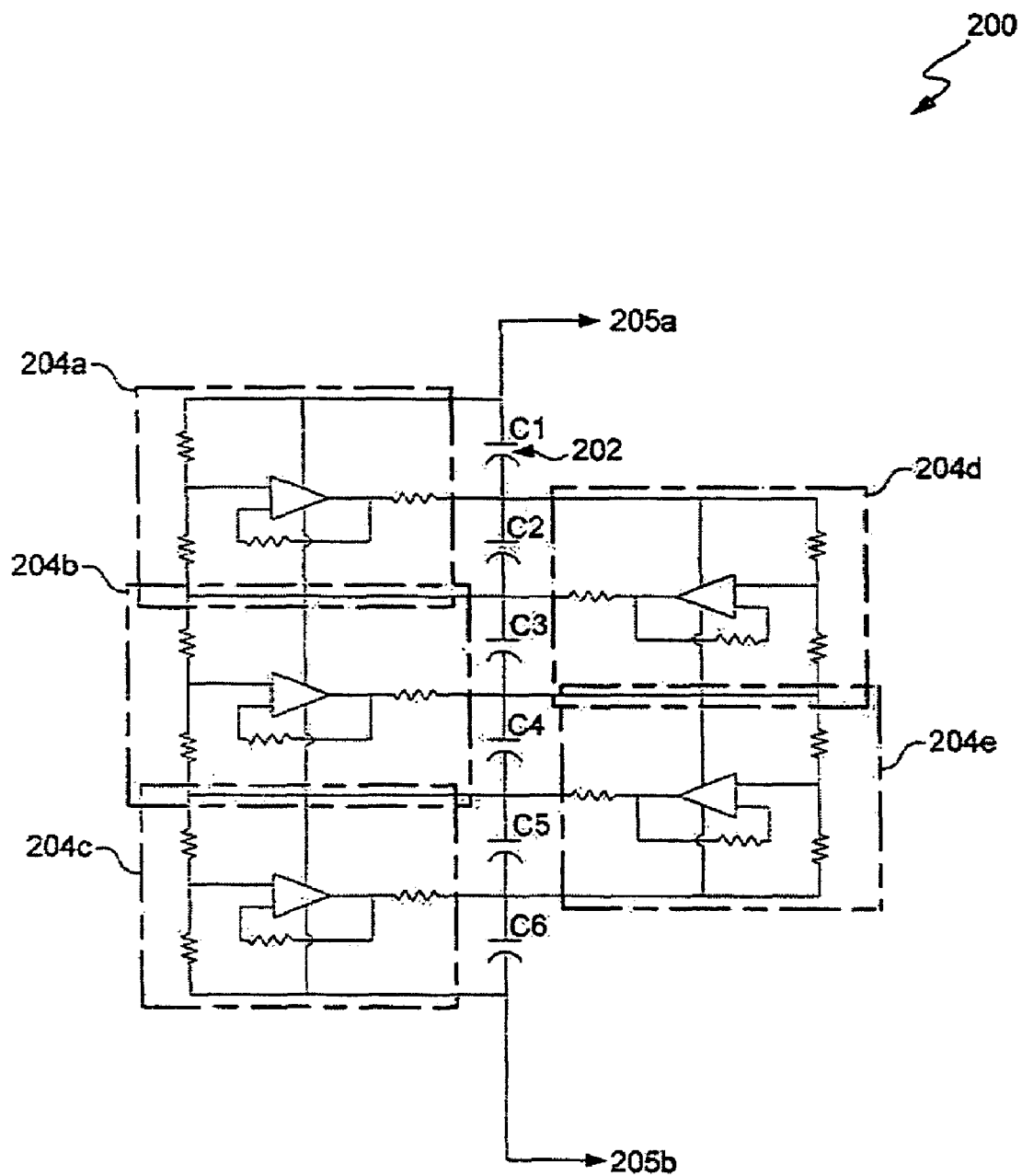
FIG. 2 illustrates an active balancing system that includes a plurality of capacitors coupled to multiple active balancing modules in accordance with various embodiments of the present invention.

Active balancing modules may be used alone or they may be combined together to form a multi-module active balancing circuitry for a plurality of capacitors stacked in a series arrangement. For instance, FIG. 2 illustrates an active balancing system 200 that includes a plurality of capacitors 202, (e.g., C1-C6) coupled to multiple active balancing modules 204 (e.g., 204a-e) in accordance with various embodiments of the present invention. The capacitors may be connected to a power source and/or a load through connections 205a and 205b. Active balancing modules 204 can be any module based active balancing circuitry (e.g., 104) for capacitors stacked in a series arrangement. For a given pair of capacitors, active balancing module 204 is typically defined as a three terminal device which attaches to the top plate of the top capacitor, the interstitial node, and the bottom plate of the bottom capacitor. Multiple active balancing modules 204 may be aligned in a side-by-side topology and/or aligned in an overlapping topology as shown in FIG. 2.

Synchronization between multiple modules may be provided. However, both op amp devices and flying capacitor devices generally makes synchronization optional. This is because each op amp device operates at a different interstitial node whereas each flying capacitor device allows the flying capacitor to sequentially connect in parallel to any number of capacitors for voltage equalization.

In general, one active balancing module 204 is required for a pair of capacitors. However, in an overlapping topology, two active balancing modules 204 are required for three capacitors, three active balancing modules 204 are required for four capacitors, and so on. In one embodiment, the overlapping topology involves having each capacitor between the top most capacitor and the bottom most capacitor operated upon by two active balancing modules 204.

A benefit of the overlapping topology forces the complete stack of capacitors to share voltage equally. Furthermore, a transitive relationship can be realized between the capacitors in the stack. For instance, consider having two modules overlapping and three capacitors A, B, and C stacked in a series arrangement. One module may force the voltage of A to equal the voltage of B. The other module may force the voltage of B to equal the voltage of C. As a result, the voltage of A will equal the voltage of C.

EXAMPLE

To further understand the benefits of the present invention, the following example provides details concerning an active balancing system with active balancing modules in accordance with one embodiment of the present invention. It should be understood the following is representative only, and that the invention is not limited by the detail set forth in this example.

Figure 3:
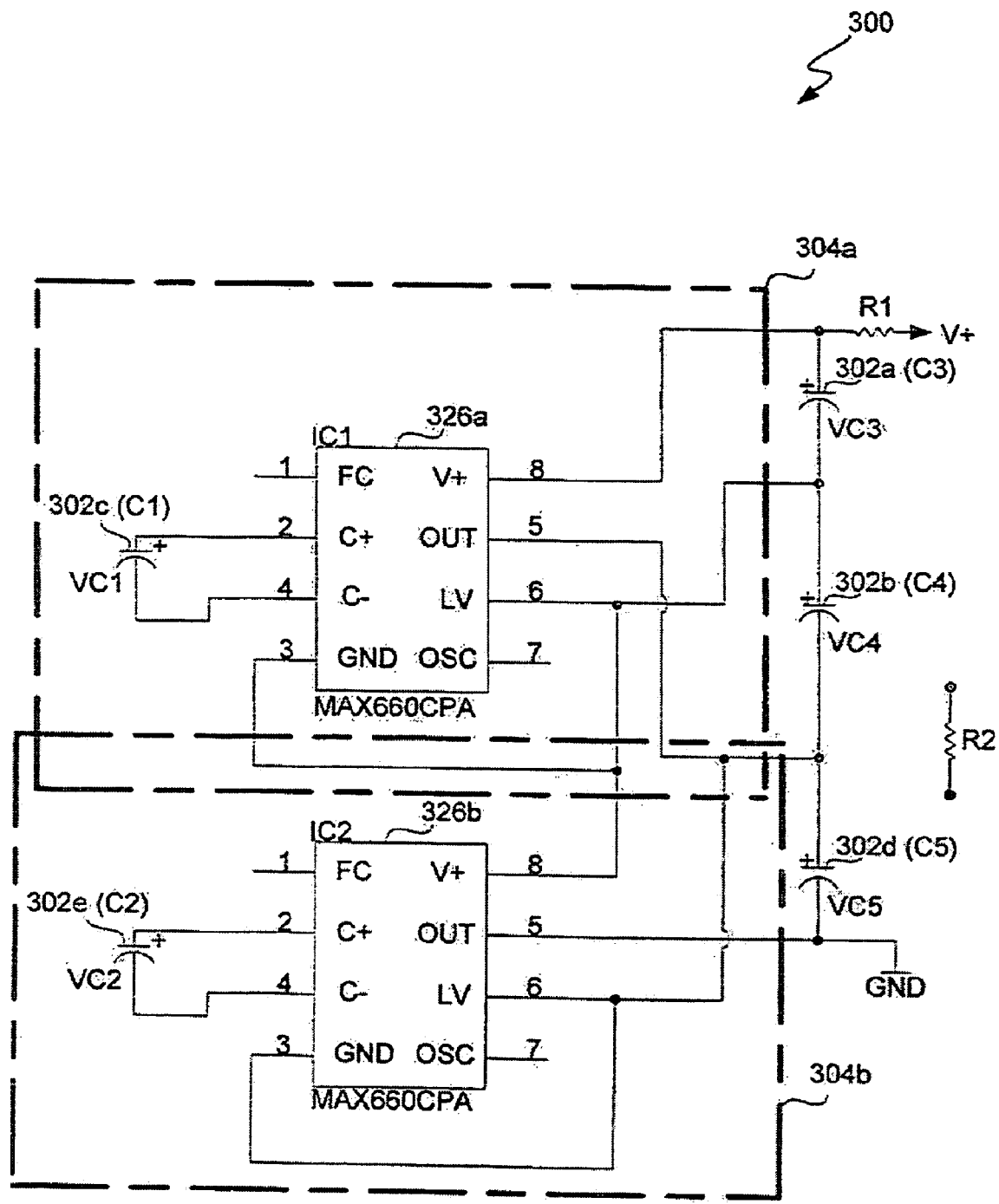
FIG. 3 illustrates an active balancing system that includes a plurality of capacitors coupled to multiple active balancing modules in accordance with various embodiments of the present invention.

FIG. 3 illustrates an active balancing system 300 that includes a plurality of capacitors 302 (e.g., 302a, 302b, 302d) coupled to multiple active balancing modules 304 (e.g., 304a, 304b). FIG. 3 illustrates the concept introduced by system 120 and system 200. As shown, active balancing modules 304a and 304b implement flying capacitor devices. With respect to active balancing module 304a, the flying capacitor device includes a switched voltage converter 326a in connection with a flying capacitor 302c. On the other hand, the flying the restoration of balance. The second experiment involved placing R2 across C4, observing the imbalance, removing R2, and observing the recovery.

The following table shows the results. The times are the approximate intervals which elapsed between when each change was made and when values were measured.

| Time    | 10 min | 1 hour | 1 hour  | 1 hour | 18 hours | 1 hour  | 5 min  |
|---------|--------|--------|---------|--------|----------|---------|--------|
| VC3     | 2.63 V | 2.61 V | 2.53 V  | 2.61 V | 2.61 V   | 2.61 V  | 2.60 V |
| VC4     | 2.59 V | 2.61 V | 2.601 V | 2.60 V | 2.60 V   | 2.57 V  | 2.61 V |
| VC5     | 2.54 V | 2.59 V | 2.638 V | 2.60 V | 2.60 V   | 2.60 V  | 2.60 V |
| Total V | 7.76 V | 7.81 V | 7.77 V  | 7.81 V | 7.81 V   | 7.78 V  | 7.81 V |
| IR1     | —      | —      | 4.67 mA | .45 mA | .13 mA   | 4.08 mA | .12 mA | capacitor device for active balancing module 304b includes a switched voltage converter 326b in connection with a flying capacitor 302e.

Theoretically speaking, switched voltage converter 326a will generally force the pair of capacitors 302a and 302b to charge to equal voltages. In achieving this, flying capacitor 302c transfers charge between capacitors 302a and 302b until their voltages are equal. Switched voltage converter 326b and its corresponding flying capacitor 302e perform the same function on the pair of capacitors 302b and 302d. It follows that the voltage across each capacitor will equilibrate at $V^+/3$.

For experimental purposes, switched voltage converters IC1 (i.e., 326a) and IC2 (i.e., 326b) are MAX660 available from Maxim Integrated Products of Sunnyvale, Calif. Flying capacitors C1 (i.e., 302c) and C2 (i.e., 302e) are 10 microfarad tantalum capacitors with working voltage ratings of 25 VDC. $V^+$ is 7.8 VDC applied through a current limiting and current measuring resistor R1. The capacitors C3, C4, and C5 are 22 Farad B Series capacitors rated at 2.5 VDC. A resistor R2 is 220 ohms and was applied across one of the capacitors in the stack to simulate a badly leaking capacitor.

In the experiment, VC1+, VC1−, VC2+, and VC2− were measured to assure that the switched voltage converters IC1 and IC2 were operating properly. VC3, VC4, VC5, and IR1 (current in R1) were also measured. The voltages were then monitored over time to determine how well the design achieved voltage balance.

The test capacitors C3, C4, C5 were measured for actual capacitance value with a constant current of 1 Ampere. The time elapsed during charging/discharging between 0.5 volts and 2.0 volts was used to calculate capacitance. The capacitance values are tabulated in the following table.

| Farads        | C3   | C4   | C5   |
|---------------|------|------|------|
| Charging      | 17.6 | 17.6 | 18.5 |
| Discharging   | 18.2 | 18.0 | 18.6 |
| Average Value | 17.9 | 17.8 | 18.6 |

IC1 and IC2 were found to reliably start up its internal oscillator when the voltage from pin 8 to pin 3 was 2 to 2.5 volts. The oscillator sometimes did not start unless pin 6 was connected as shown.

The first experiment involved charging the stack, observing the balance, applying R2 across C3, observing the imbalance which equilibrates, removing R2, and finally observing Inspection of the results shows that the design drives the balance to within about 0.02 volts. R2 represents a serious leakage path, in excess of 10 mA. The worst out-of-balance this caused was only 0.07 volts lower voltage across the "leaker". In the second case, the voltage was lower by only 0.03 volts. However, the overall leakage was under 5 mA in both cases. Apparently, the flying capacitor operation was returning the leakage charge back to the opposite plate of the "leaker". In this way, the flying capacitor technique is more efficient than shunt elements or source/sink voltage followers used for active balancing.

Packaging of Active Balancing Module

Figure 4A:
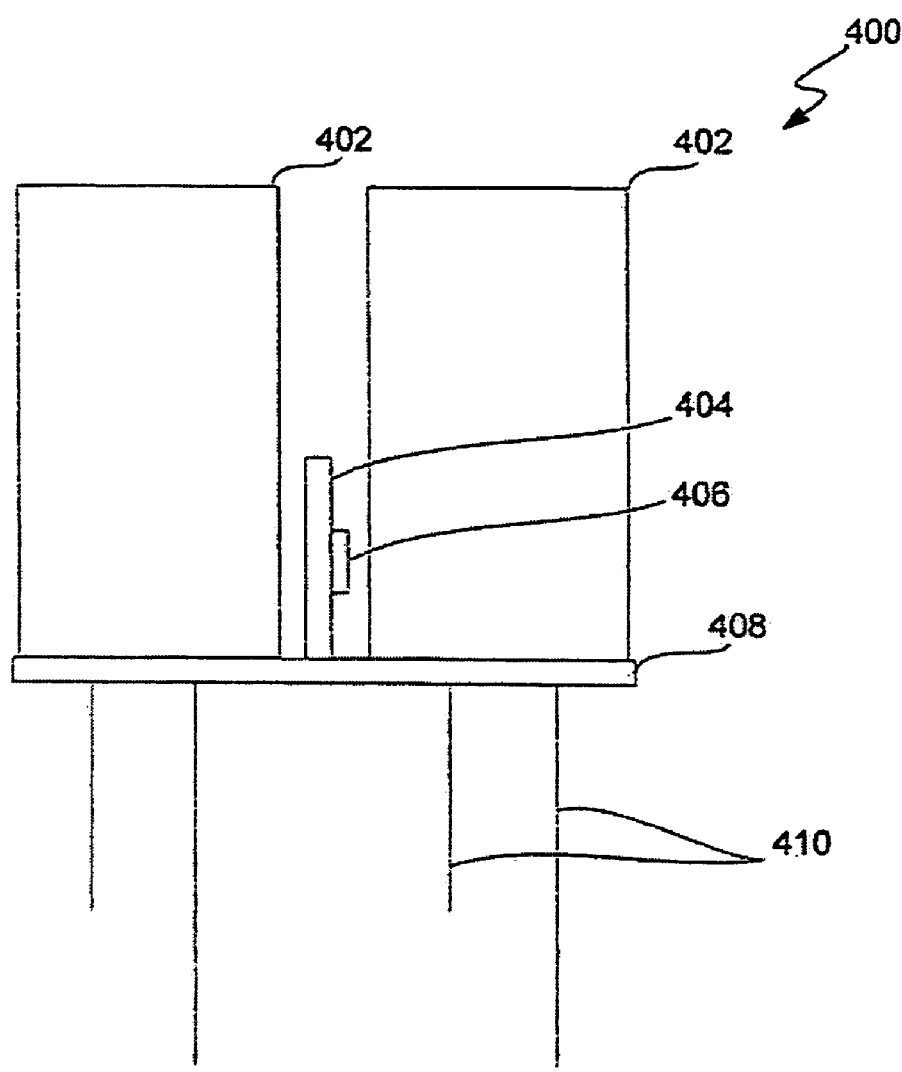
FIG. 4A illustrates a side plan view of a capacitor device package in accordance with a first embodiment of the present invention.
Figure 4B:
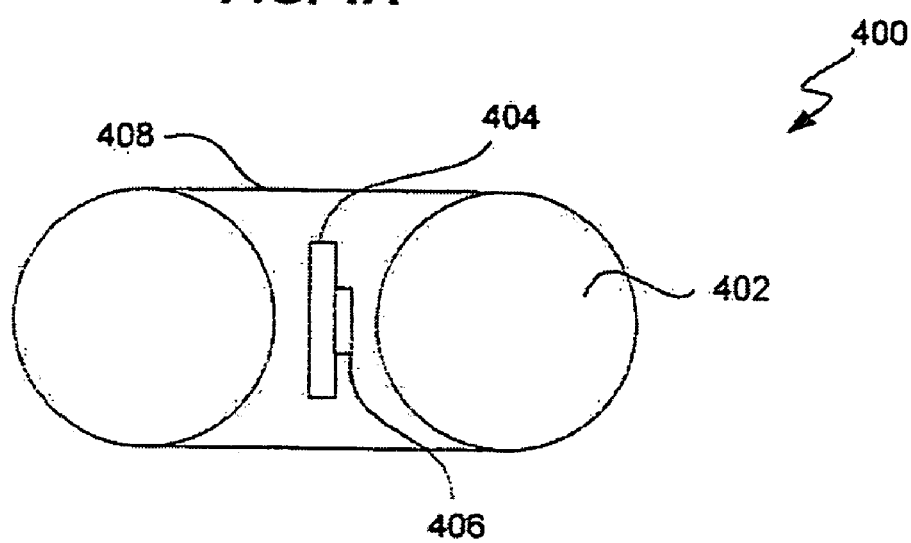
FIG. 4B illustrates a top plan view of the capacitor device package in FIG 4A.

Based on the modularity of the active balancing module, a variety of capacitor device packages may be achieved. These packages illustrate the versatility of the active balancing modules of the present invention. For example, FIG. 4A illustrates a side plan view of a capacitor device package 400 in accordance with a first embodiment of the present invention. On the other hand, FIG. 4B illustrates a top plan view of capacitor device package 400.

As shown, capacitor device package 400 includes a pair of capacitors 402 mounted along with a daughter board 404 on top of a motherboard 408. Capacitor 402 may be packaged in any conventional way that will be acceptable to the particular application. For instance, capacitors 402 may be wound (coiled) type capacitors within protective plastic canisters. An active balancing circuitry 406 is included on daughter board 404. Both daughter board 404 and motherboard 408 provide connectivity between active balancing circuitry 406, capacitors 402, and external leads 410 (e.g., 105a, 105b, 205a, 205b), which are attached to the bottom of motherboard 410. External leads 410 are usually made of an electrical conductive material such as copper and may be plated for durability.

In general, each daughter board 404 will contain just one active balancing circuit 406. The daughter board together with the active balancing module will often be located proximate to (e.g., between) the corresponding pair of capacitors 402 that the active balancing module actively balances. Any active balancing circuitry 406 may be used to form the capacitor device package 400. Typically, active balancing circuitry 406 contains circuitry that may be similar to active balancing modules 104, 204, or 304. As such, daughter board 404 may act as an active balancing module in accordance with the present invention.

Capacitor device package 400 may be expandable to any number of capacitors 402 stacked in a series arrangement. To doing so, motherboard 408 and external leads 410 may be expanded to accommodate any number of capacitors 402. For example, for a three-capacitor series configuration, two corresponding daughter boards 404 having overlapping active balancing circuitry 406 can be positioned there between. That is, each capacitor 402 will be separated from an adjacent capacitor by a daughter board 404. In general, each daughter board 404 (active balancing module) will be identical in construction and functionality. Due to the modularity of active balancing modules, a daughter board (active balancing module) can easily be added accordingly with any number of additional series connected capacitors.

Figure 5A:
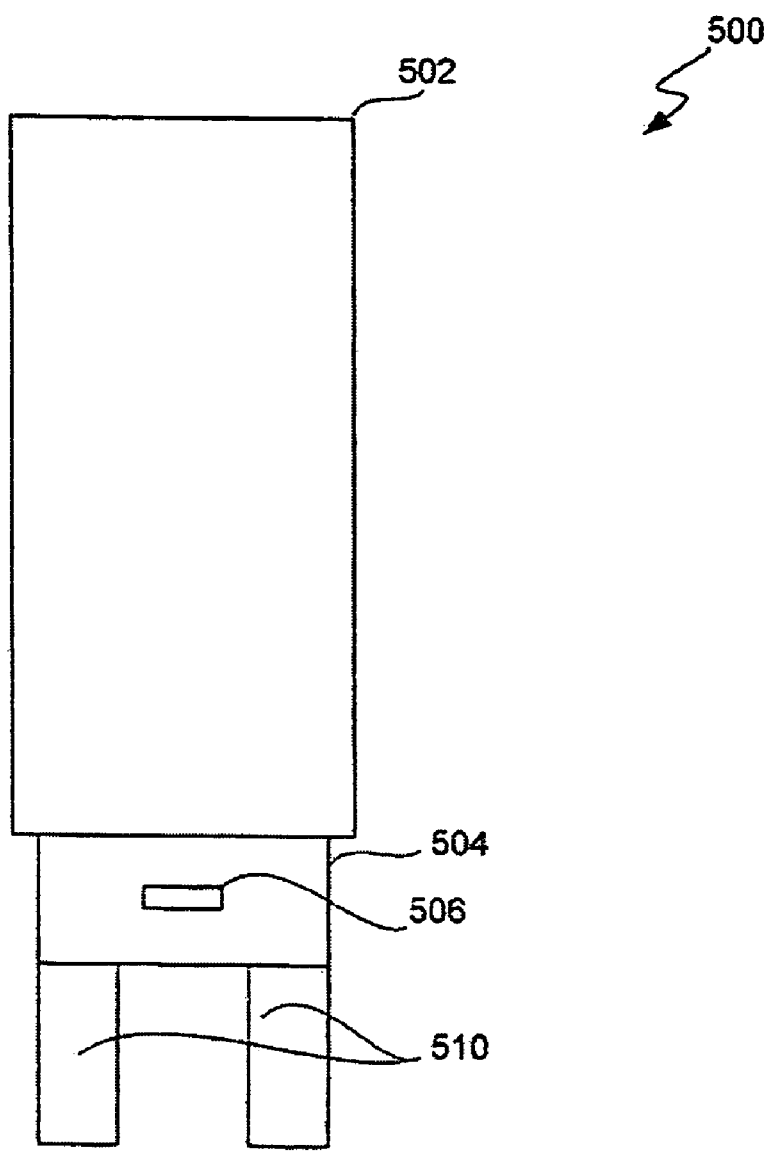
FIG. 5A illustrates a side plan view of a capacitor device package in accordance with a second embodiment of the present, invention.
Figure 5B:
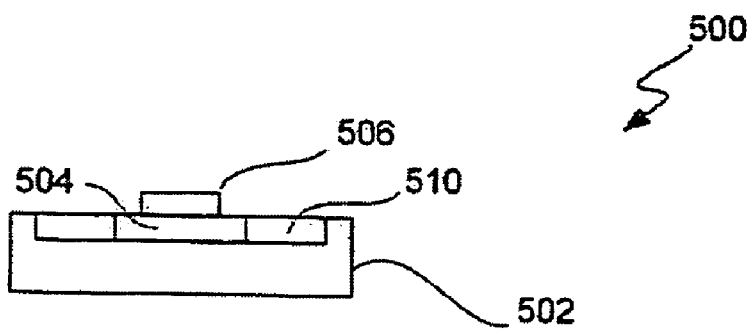
FIG. 5B illustrates a bottom plan view of the capacitor device package in FIG. 5A.

Other alternative capacitor device packages may be adapted for implementing the present invention. For example, FIG. 5A illustrates a side plan view of a capacitor device package 500 in accordance with a second embodiment of the present invention where FIG. 5B illustrates a corresponding bottom plan view of capacitor device package 500.

Capacitor device package 500 implements a flex circuit construction and includes a capacitor 502. Capacitor 502 generally is used when a thin/low profile capacitor device package is sought. Capacitor 502 is typically a folded type capacitor where capacitor sheets are folded within a flexible protective shell. However, multiple capacitors may be integrated within Capacitor 502. For example, Capacitor 502 may include a plurality of capacitors stacked in a series arrangement.

Capacitor 502 is connected to external leads 510. In this embodiment, capacitor 502 and external leads 510 are substantially flat, rectangular, and flexible in form. External leads 510 provide electrical connection to capacitor device package 500 and may be formed use any electrical conducting material.

Mounted across the external leads 510 and in connection therewith, an active balancing module 504 having active balancing circuitry 506 is formed. Typically, active balancing circuitry 504 contains circuitry that may be similar to active balancing modules 104, 204, or 304. Any material may be used to construct active balancing module 504. Preferably, the material used will be consistent with the design application. For instance, a flexible material that is easily adaptable to external leads 510 can be used. In general, active balancing module 504 will provide connections between active balancing circuitry 506 and capacitor 502.

Figure 6A:
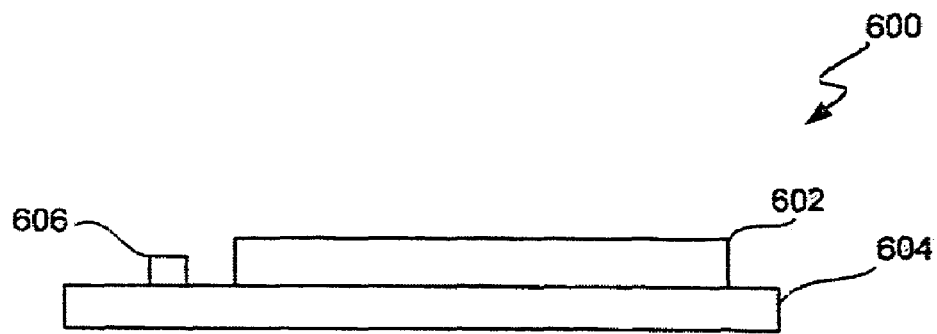
FIG. 6A illustrates a side plan view of a capacitor device package in accordance with a third embodiment of the present invention.
Figure 6B:
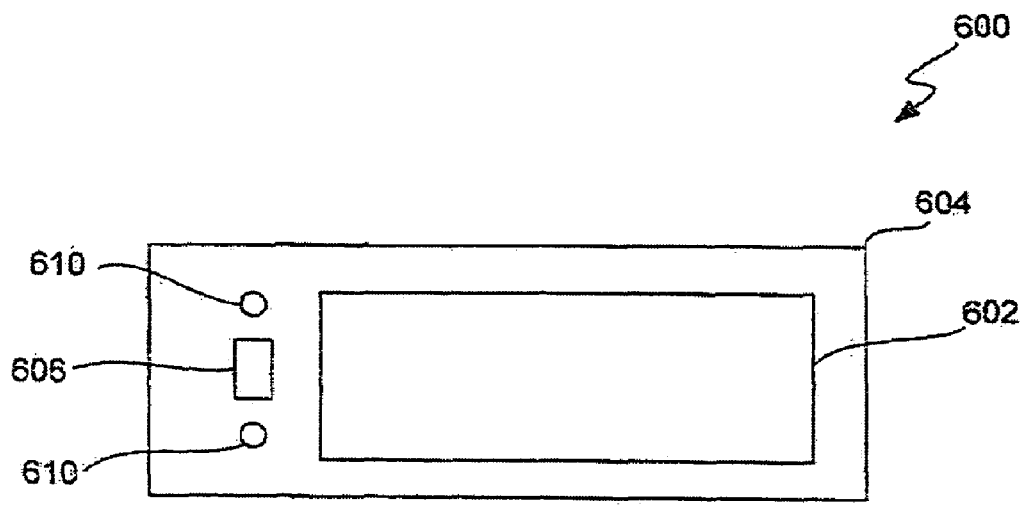
FIG. 6B illustrates a top plan view of the capacitor device package in FIG. 6A.

Finally, FIG. 6A illustrates a side plan view of a capacitor device package 600 in accordance with a third embodiment of the present invention where FIG. 6B illustrates a top plan view of capacitor device package 600.

As shown, a capacitor 602 is mounted together with an active balancing module 606 on a top surface of a substrate 604 (e.g., motherboard). Substrate 604 is generally composed of a non-conductive material, for example, of ceramic, plastic, or another suitable material as are well known to those skilled in the art. Substrate 604 includes a pair of vias 610 for connection to pads located on its opposing surface. Substrate 604 includes electrical traces (not shown) for connecting capacitor 602, active balancing module 606, and vias 610 together in accordance with the present invention. As such, capacitor device package 600 can be easily mounted into any electronic device (e.g., cell phone).

Figure 6C:
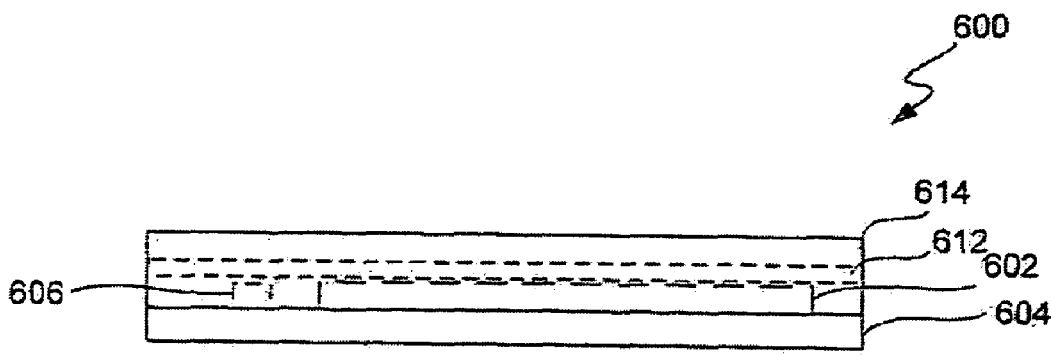
FIG. 6C illustrates a side plan view of the capacitor device package in FIG. 6A encapsulated in molding material.

Alternatively, capacitor device package 600 may be further encapsulated for more protection. For example, FIG. 6C illustrates a side plan view of capacitor device package 600 encapsulated in molding material. Any conventional molding material (e.g., plastic) may be used. Prior to encapsulation to form a lid 614, a substrate 612 may be added to cover capacitor device package 600. If at all, substrate 612 may extend over and cover above any portion of module 606, capacitor 602, and/or substrate 604. Likewise, if at all, molding material may encapsulate any portion of module 606, capacitor 602, and/or substrate 604. As with substrate 604, substrate 612 is also generally composed of a non-conductive material, for example, of ceramic, plastic, or another suitable material as is well known to those skilled in the art. The purpose of substrate 612 is to provide structural stability to the encapsulated capacitor device package 600.

Packages 400, 500, and 600 are useful for power back-up applications and are easily and inexpensively constructed using as components the active balancing modules of the present invention. Many of the components for implementing the present invention are also readily available off-the-shelf low cost components.

The present invention presents many advantages over conventional methods, especially in the area of supercapacitors. Since supercapacitors typically have a maximum operating voltage in the range of 2.3 volts to 2.7 volts, low quiescent current active elements (e.g., op amp device 112) may be used in minimizing the leakage current drain in the active balancing system. The active balancing modules may also be scalable based on the application. For example, selecting an active element based on the anticipated current flow of the system. Furthermore, the simplicity of a three terminal module and a low component count allows for fewer connections and easier packaging integration with a plurality of capacitors in a series arrangement.

Another advantage of the present invention is that the active elements (e.g., op amp device 112, flying capacitor device 122) will unlikely and perhaps never see V+ and V− substantially exceeding the combined rated voltage of their corresponding capacitors, which in some cases total 5 volts (2.5 volts for each capacitor of a corresponding capacitor pair). This is due to how the active element power connections are referenced (e.g., between two capacitors; 106a and 106c). As such, the rating of the active elements may all be individually selected based on the combined rated voltage of their corresponding capacitors. Therefore, for large stacks where the voltage between the very top and very bottom capacitors becomes large, low cost and low voltage active elements can continue to be implemented there between.

Yet, another advantage of the present invention is the ability to substantially balance the leakage current during the equilibrium state (e.g., during standby). This is important since capacitors spend most of their time in standby waiting to supply a load. As such, any leakage current mismatches during this time will cause overvoltage conditions to exist as well. Therefore, persistent leakage current mismatches during the equilibrium state can significantly reduce the life of the capacitors.

Although the foregoing invention has been described in some detail for purposes of clarity of understanding, it will be apparent that certain changes and modifications may be practiced within the scope of the appended claims. It should be noted that there are many alternative ways of implementing both the process and apparatuses of the present invention. Accordingly, the present embodiments are to be considered as illustrative and not restrictive, and the invention is not to be limited to the details given herein.

The invention claimed is:

1. A capacitor device package, comprising:
   a plurality of capacitors electrically connected in a series arrangement; and
   a module having inductor-free circuitry for controlling voltage imbalances between a pair of capacitors connected in the series arrangement, comprising:
      a first terminal configured for connection to a positive plate of the first capacitor;

a second terminal configured for connection to a negative plate of the first capacitor and to a positive plate of the second capacitor
a third terminal configured for connection to a negative plate of the second capacitor; and
an active element integrated within the inductor-free circuitry between the first, second, and third terminals and adapted to substantially balance the voltage imbalances between the pair of capacitors, the active element having power connections to the first and third terminals.

2. The capacitor device package of claim 1, wherein the plurality of capacitors is mounted on a motherboard having electrical connections for connecting the plurality of capacitors, the module, and external connections with each other.

3. The capacitor device package of claim 2, wherein the module is mounted on a daughter board, the daughter board being mounted on the motherboard.

4. The capacitor device package of claim 2, wherein a substrate is positioned above the module, the plurality of capacitors, and the motherboard.

5. The capacitor device package of claim 4, wherein portions of the substrate, motherboard, module, and plurality of capacitors are encapsulated in molding material.

6. The capacitor device package of claim 1, wherein the plurality of capacitors is connected to external leads in a flex circuit construction.

7. The capacitor device package of claim 6, wherein the module is mounted across the external leads, the module also having a flex circuit construction.

8. The capacitor device package of claim 1, wherein at least one of the terminals is further configured for connection to a second module having inductor-free circuitry for controlling voltage imbalances between a second pair of capacitors connected in the series arrangement.

9. The capacitor device package of claim 8, wherein the first and second modules' inductor-free circuitries are substantially identical.

10. The capacitor device package of claim 8, wherein the first and second modules' circuitry overlap upon connection to the second module.

11. The capacitor device package of claim 8, wherein the first and second modules' circuitry overlap at one of the terminals.

12. The capacitor device package of claim 8, wherein the first and second modules' circuitry overlap across a common capacitor shared by the two pairs of capacitors.

13. The capacitor device package of claim 8, wherein the first and second modules' inductor-free circuitries are identical.

14. The capacitor device package of claim 13 wherein the first and second modules' circuitry overlap upon connection to the second module.

15. The capacitor device package of claim 14, wherein the first and second modules' circuitry overlap across a common capacitor shared by the two pairs of capacitors.

16. The capacitor device package of claim 1, wherein the power connections are 1) between a V− terminal of the active element and the first terminal; and 2) between a V− terminal of the active element and the third terminal.

17. A capacitor device package, comprising:
a plurality of capacitors electrically connected in a series arrangement; and
a module having inductor-free circuitry for controlling voltage imbalances between a pair of capacitors connected in the series arrangement, comprising:
a first terminal configured for connection to a positive plate of the first capacitor;
a second terminal configured for connection to a negative plate of the first capacitor and to a positive plate of the second capacitor;
a third terminal configured for connection to a negative plate of the second capacitor, and
an active element integrated within the inductor-free circuitry between the first, second, and third terminals and adapted to substantially balance the voltage imbalances between the pair of capacitors, the active element having power connections to the first and third terminals,
wherein the active element is an op amp, the op amp having an input, an output, and a feedback loop, the input being connected to two voltage dividing resistors, the output being connected to the second terminal through a current limiting resistor, wherein an end of the feedback loop is connected between the output and the current limiting resistor.

18. The capacitor device package of claim 17, wherein the feedback loop includes a feedback resistor.

19. The capacitor device package of claim 17, wherein at least one of the terminals is further configured for connection to a second module having inductor-free circuitry for controlling voltage imbalances between a second pair of capacitors connected in the series arrangement.

20. The capacitor device package of claim 19, wherein the first and second modules' inductor-free circultries are substantially identical.

21. The capacitor device package of claim 19 wherein the first and second modules' circuitry overlap upon connection to the second module.

22. The capacitor device package of claim 21, wherein the first and second module' s circuitry overlap at one of the terminals.

23. The capacitor device package of claim 21, wherein the first and second modules' circuitry overlap across a common capacitor shared by the two pairs of capacitors.

24. The capacitor device package of claim 19, wherein the first and second modules' inductor-free circuitries are identical.

25. The capacitor device package of claim 24 wherein the first and second modules' circuitry overlap upon connection to the second module.

26. The capacitor device package of claim 25, wherein the first and second modules' circuitry overlap across a common capacitor shared by the two pairs of capacitors.

27. The capacitor device package of claim 17, wherein the power connections are 1) between a V+ terminal of the active element and the first terminal, and 2) between a V− terminal of the active element and the third terminal.

28. The capacitor device package of claim 17, wherein the plurality of capacitors is mounted on a motherboard having electrical connections for connecting the plurality of capacitors, the module, and external connections with each other.

29. The capacitor device package of claim 28, wherein the module is mounted on a daughter board, the daughter board being mounted on the motherboard.

30. The capacitor device package of claim 28, wherein a substrate is positioned above the module, the plurality of capacitors, and the motherboard.

31. The capacitor device package of claim 30, wherein portions of the substrate, motherboard, module, and plurality of capacitors are encapsulated in molding material.

32. The capacitor device package of claim 17, wherein the plurality of capacitors is connected to external leads in a flex circuit construction.

33. The capacitor device package of claim 32, wherein the module is mounted across the external leads, the module also having a flex circuit construction.

34. A capacitor device package, comprising:
- a plurality of capacitors electrically connected in a series arrangement; and
- a module having inductor-free circuitry for controlling voltage imbalances between a pair of capacitors connected in the series arrangement, comprising:
  - a first terminal configured for connection to a positive plate of the first capacitor;
  - a second terminal configured for connection to a negative plate of the first capacitor and to a positive plate of the second capacitor,
  - a third terminal configured for connection to a negative plate of the second capacitor; and
  - an active element integrated within the inductor-free circuitry between the first, second, and third terminals and adapted to substantially balance the voltage imbalances between the pair of capacitors, the active element having power connections to the first and third terminals, wherein the active element is a switched voltage converter that incorporates a flying capacitor.

* * * * *